United States Patent [19]

Schutz

[11] 4,217,270
[45] Aug. 12, 1980

[54] SULFO SUBSTITUTED CHROMIUM CONTAINING AZO PYRAZOLONE DYESTUFF

[75] Inventor: Hans U. Schutz, Basel, Switzerland

[73] Assignee: Ciba-Geigy Corporation, Ardsley, N.Y.

[21] Appl. No.: 695,706

[22] Filed: Jun. 14, 1976

Related U.S. Application Data

[63] Continuation of Ser. No. 540,200, Jan. 10, 1975, abandoned.

[30] Foreign Application Priority Data

Jan. 30, 1974 [CH] Switzerland .................. 1262/74

[51] Int. Cl.² ............. C09B 45/16; C09B 45/48; D06P 1/10; D06P 3/24
[52] U.S. Cl. ................ 260/145 B; 260/147; 260/163
[58] Field of Search ................... 260/145 B

[56] References Cited

U.S. PATENT DOCUMENTS

| | | | |
|---|---|---|---|
| 2,806,760 | 9/1957 | Brassel et al. | 260/145 A UX |
| 3,041,327 | 3/1962 | Buehler et al. | 260/145 A |
| 3,308,114 | 3/1967 | Blackhall | 260/145 A |

FOREIGN PATENT DOCUMENTS 986655 3/1965 United Kingdom ............... 260/145 B

*Primary Examiner*—Floyd D. Higel
*Attorney, Agent, or Firm*—Edward McC. Roberts; Michael W. Glynn

[57] ABSTRACT

The invention relates to the chromium complex dye of the formula

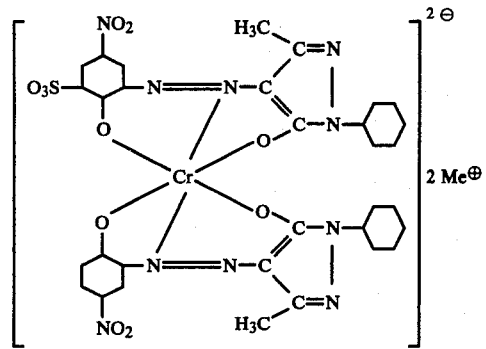

wherein Me⊕ is a cation, useful for dyeing nitrogenous materials to produce dyeings which are level and have good fastness to light, washing, fulling, decatizing and carbonizing.

1 Claim, No Drawings

SULFO SUBSTITUTED CHROMIUM CONTAINING AZO PYRAZOLONE DYESTUFF

This is a continuation of application Ser. No. 540,200, filed on Jan. 10, 1975 and now abandoned.

The invention provides a process for the manufacture of a novel chromium complex dye by converting one of the azo dyes of the formulae

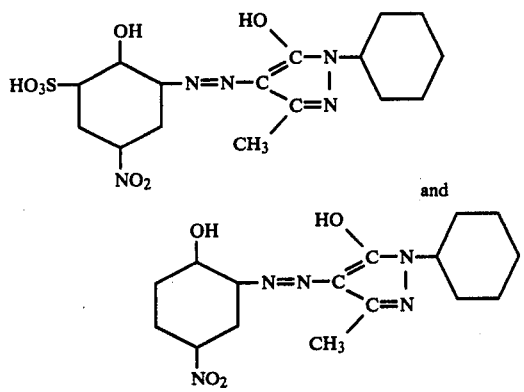

with a chromium donor into the 1:1 chromium complex and subsequently reacting this latter with the non-metallised dyed of the formula (2) or (1) to form the 1:2 chromium complex. Preferably the 1:1 chromium complex is manufactured from the dye of the formula (1) and the dye of the formula (2) is added thereto.

The novel chromium complex dye has the formula

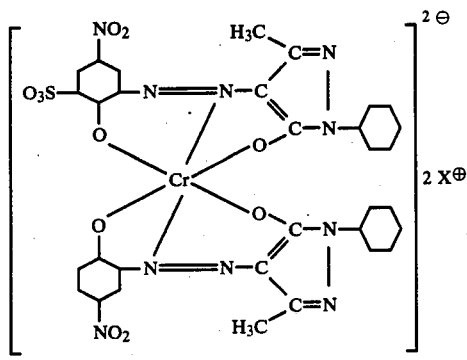

wherein $X^\oplus$ is a cation, and also constitutes the invention. The conversion of the dyes of the formula (1) or (2) into the 1:1 chromium complex is accomplished by conventional methods which are known per se, e.g. by reacting it in an acid medium with a salt of trivalent chromium, e.g. chromium formiate, chromium sulphate or chromium fluoride, at boiling temperature or optionally at temperatures exceeding 100° C. Trivalent chromium can also be manufactured in the reaction mixture from chromium-VI compounds by simultaneously adding a reducing agent, e.g. glucose. In general, it is advisable to carry out the metallising in the presence of organic solvents, e.g. alcohols or ketones, and preferably excluding water as far as possible.

It is normally advantageous not to dry the starting dyes required in the present process after their manufacture and precipitation, but to process them further as a moist paste.

The reaction of the 1:1 chromium complex of the dye of the formula (1) or (2) with the metal-free dye of the formula (2) or (1) is desirably carried out in a medium which is neutral to weakly alkaline, in an open or a sealed vessel, and at normal or elevated temperature, e.g. at temperatures between 50° and 120° C. The process can be carried out in organic solvents, e.g. alcohols or ketones or in an aqueous solution. It is possible to promote the reaction if so desired by adding solvents, for example alcohols or dimethyl formamide, It is usually advisable to react as far as possible equivalent amounts of the chromium-containing 1:1 complex and the metal-free dye, the molecular ratio between metal-free dye and 1:1 chromium complex being desirably at least 0.85:1 and at most 1:0.85. A surplus of metal-containing dye is usually less disadvantageous than one of metal-free dye. The closer this ratio is to 1:1 the more advantageous the result generally is.

The novel chromium-containing mixed complex obtained by the above process is isolated with advantage in the form of a salt, especially an alkali salt, above all a sodium or also an ammonium salt or a salt of organic amines, and it is suitable for dyeing and printing different materials, but principally for dyeing nitrogenous materials, e.g. silk, leather and especially wool, as well as synthetic fibres made from polyamides or polyurethanes. It is suitable above all for dyeing from a weakly alkaline, a neutral or a weakly acid bath, for example from an acetic bath. The resultant dyeings are level and have good fastness to light, washing, fulling, decatising and carbonising.

Compared with the dye which is known from French Pat. No. 1.371.123 and which differs from the novel dye in that in the diazo component of the dye that contains no sulpho groups the nitro group is in 5-position instead of in 4-position, the dye according to the invention is surprisingly characterised by an appreciably better build-up and a better affinity for polyamide as well as by improved fastness to water and perspiration.

The following Example will serve to illustrate the invention, the parts therein being by weight.

EXAMPLE 51.9 parts of the 1:1 chromium complex of the dye obtained from 4-nitro-2-amino-1-hydroxybenzene-6-sulphonic acid and 1-phenyl-3-methyl-5-pyrazolone and 33.9 parts of the monoazo dye obtained from 4-nitro-2-amino-1-hydroxybenzene and 1-phenyl-3-methyl-5-pyrazolone are heated in 1000 parts of water to 95° C. The bath is adjusted to a pH of 8 with sodium hydroxide solution and stirred for 4 hours at 90° C. to 95° C. Upon termination of the reaction, the dye is precipitated by addition of sodium chloride, filtered off and dried. It is an orange powder which gives an orange solution in water and dyes wool or polyamide in orange shades of good fastness properties.

I claim:

1. The chromium complex dye of the formula

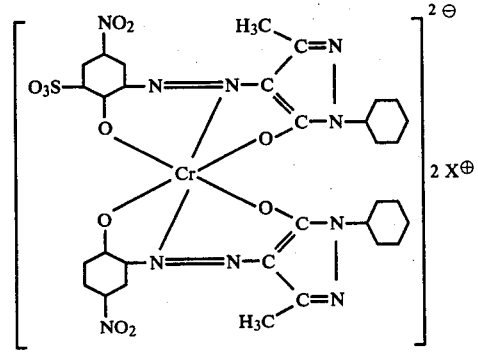

wherein $X^\oplus$ is a cation.

* * * * *